United States Patent [19]

Kossatz et al.

[11] Patent Number: 4,902,348
[45] Date of Patent: Feb. 20, 1990

[54] REINFORCED PLASTERBOARD AND METHOD OF FORMING

[75] Inventors: Gert Kossatz; Heinz Sattler, both of Braunschweig; Rüdiger Kammerer, Bad Honnef; Hanns I. Sachs; Dietmar Schäpel, both of Cologne, all of Fed. Rep. of Germany

[73] Assignee: Bayer Aktiengesellschaft, Leverkusen, Fed. Rep. of Germany

[21] Appl. No.: 256,885

[22] Filed: Oct. 12, 1988

Related U.S. Application Data

[63] Continuation of Ser. No. 78,359, Jul. 28, 1987, abandoned.

[30] Foreign Application Priority Data

Aug. 1, 1986 [DE] Fed. Rep. of Germany ....... 3626048

[51] Int. Cl.⁴ .................... C04B 24/12; C04B 18/26
[52] U.S. Cl. .................................. 106/111; 106/115; 521/100; 264/333; 156/42
[58] Field of Search .................. 156/39, 41, 42, 44, 156/45; 106/111, 114, 115; 521/100; 428/312.4, 703; 264/333

[56] References Cited

U.S. PATENT DOCUMENTS

| | | | |
|---|---|---|---|
| 3,965,051 | 6/1976 | Markusch et al. | 521/100 |
| 4,047,962 | 9/1977 | Copeland | 106/115 |
| 4,097,422 | 6/1978 | Markush | 521/100 |
| 4,211,848 | 7/1980 | Blount | 521/100 |
| 4,303,722 | 12/1981 | Pilgrim | 156/3 |
| 4,313,112 | 11/1983 | Reiff | 528/73 |
| 4,328,178 | 5/1982 | Kossatz | 106/110 X |

FOREIGN PATENT DOCUMENTS

| | | |
|---|---|---|
| 0023579 | 2/1981 | European Pat. Off. . |
| 0019207 | 5/1983 | European Pat. Off. . |
| 2919311 | 9/1980 | Fed. Rep. of Germany . |
| 2026500 | 2/1980 | United Kingdom . |

*Primary Examiner*—Robert A. Dawson
*Assistant Examiner*—Michele K. Yoder
*Attorney, Agent, or Firm*—Sprung Horn Kramer & Woods

[57] ABSTRACT

The present invention is directed to a process for the manufacture of plasterboard optionally strengthened with reinforcing materials by mixing gypsum capable of rehydration with water and optionally reinforcing materials and subsequently pressing the resulting mixture, characterized in that polyisocyanates are added to the mixture used for producing the plasterboard and/or are applied to the surface of the finished plasterboard. The invention is also directed to the optionally reinforced plasterboard.

13 Claims, No Drawings

REINFORCED PLASTERBOARD AND METHOD OF FORMING

This is a continuation of now abandoned application Ser. No. 078,359, filed July 28, 1987, now abandoned.

BACKGROUND OF THE INVENTION

1. Field of the Invention

This invention relates to a process for the manufacture of reinforced plasterboard from gypsum (hemihydrate) and optionally reinforcing materials, preferably cellulose particles, with the addition of polyisocyanates in the production of plasterboard and/or the application of polyisocyanates to the surface of plasterboard.

The invention further relates to polyurea-modified, reinforced plasterboard with improved strength, water-resistance and flexural strength from gypsum (hemihydrate), optionally reinforcing materials, preferably cellulose particles, and polyisocyanates.

2. Description of the Prior Art

Plasterboard is presently widely used in the building industry, especially for so-called dry internal rendering, by virtue of its advantageous properties. It is customary to use plasterboard in which the tendency to fracture due to its brittleness has been reduced by facing it with cardboard or homogeneously incorporating cellulose particles. The wood-plasterboard described in DE-B No. 2,919,311 and homogeneously reinforced with wood chips (so-called wood plasterboard) constitutes a new variety of plasterboard.

Although plasterboards of this type have in some cases proven satisfactory, difficulties arise when they are used in so-called moist interiors, e.g. in cellars, kitchens and bathrooms. The difficulties are due to the tendency of plasterboard to swell in the presence of water and subsequently disintegrate.

It has been recommended to impregnate plasterboard with paraffin with a view to overcoming these difficulties. This method, however, provides only a limited water-repellency since the paraffins are only bound by adsorption.

It has now been found that plasterboard, especially plasterboard which has been strengthened with reinforcing materials of an inorganic nature such as glass fibers or with organic, natural, semi-synthetic or synthetic fibers, in particular plasterboard reinforced with cellulose particles, can be obtained with improved water-resistance combined with increased flexural strength if polyisocyanates are added during the process of producing the plasterboard and/or are applied to the surface of the finished plasterboard.

SUMMARY OF THE INVENTION

The present invention is directed to a process for the manufacture of plasterboard optionally strengthened with reinforcing materials by mixing gypsum capable of rehydration with water and optionally reinforcing materials and subsequently pressing the resulting mixture, characterized in that polyisocyanates are added to the mixture used for producing the plasterboard and/or are applied to the surface of the finished plasterboard.

The invention is also directed to the optionally reinforced plasterboard.

The present invention relates to a process comprising mixing a gypsum binder capable of hydration, water, and optionally reinforcing materials and subsequently pressing the resulting mixture. The present process additionally comprises adding a polyisocyanate to the mixture before pressing and/or applying polyisocyanate to the surface of the plasterboard after pressing. The ratio of wood chips and gypsum to water used in the instant invention is in the range of 2.6:1 to 3.2:1.

DETAILED DESCRIPTION OF THE INVENTION

The polyureas contained in the plasterboard according to the invention are formed from the polyisocyanates added. The polyisocyanates which may be used for the preparation of the polyureas include aliphatic, cycloaliphatic, araliphatic, aromatic and heterocyclic polyisocyanates of the kind described, for example, by W. Siefken in Liebig's Annalen der Chemie, Volume 562, pages 75 to 136, and modified polyisocyanates obtained by the introduction of e.g. of allophanate, biuret, urethane or isocyanurate groups.

The various toluylene diisocyanates, diphenylmethane diisocyanates and especially polymethylene polyphenyl polyisocyanates and mixtures of the isocyanates are preferred. Polyisocyanates which can be emulsified in water by the addition of emulsifying agents or by modification e.g. with sulphonic acid groups, are also preferred.

Such polyisocyanates with have been rendered dispersible in water by the addition of emulsifiers are described, for example, in DE-A No. 2,921,681. Polyisocyanates rendered emulsifiable by modification with sulphonic acids are disclosed in DE-A No. 2,441,843 and in EP-A No. 19,859. Other forms of polyisocyanates suitable for the manufacture of the plasterboard according to the invention include aqueous emulsions of polyisocyanates and aqueous paraffin dispersions as described in EP-A No. 0,084,313; polyisocyanates modified with phosphoric acid diesters according to DE-A No. 3,108,538; and polyisocyanates modified with polyethylene glycol or polyethylene glycol monoalkyl ethers or with cement, polyvinyl alcohol or polyvinyl pyrrolidone.

For the purpose of this invention it is preferred, as previously mentioned above, to use commercial polyphenylpolymethylene polyisocyanates as the isocyanate component of the binder. In this connection, it has been found particularly suitable (see DE-A No. 2,711,958) to use an isocyanate component containing the phosgenation product of the undistilled bottoms fraction obtained after the removal of about 25 to 90% by weight, preferably about 30 to 85% by weight, of 2,2'-, 2,4'- and/or 4,4'-diaminodiphenylmethane from an aniline/formaldehyde condensate or to use the undistilled bottoms fraction obtained after the removal of about 25 to 90% by weight, preferably about 30 to 85% by weight, of 2,2'-, 2,4'- and/or 4,4'-diisocyanato diphenylmethane from the crude phosgenation product of an aniline/formaldehyde condensate. The polyisocyanate contains about 35 to 70% by weight, preferably about 45 to 60% by weight of diisocyanatodiphenylmethane in which the 2,4'-diisocyanatodiphenylmethane content is about 1 to 8% by weight, preferably about 2 to 5% by weight, and the 2,2'-diisocyanatodiphenylmethane content is 0 to about 2% by weight. The polyisocyanate has a viscosity at 25° C. of about 50 to 600 mPas, preferably about 200 to 500 mPas and an isocyanate content of about 28 to 32% by weight.

It will be clear from what has been said above that such bottoms fractions may be obtained, for example, by removing about 45 to 90% by weight, preferably about 55 to 85% by weight of 4,4'-diisocyanatodiphenylmethane from a crude diphenylmethane diisocyanate containing more than about 85% by weight, preferably more than about 90% by weight of 4,4'-diisocyanatodiphenylmethane. A crude diphenylmethane diisocyanate of this kind may be obtained, for example, by the process according to DE-A No. 2,356,828.

Such a product may also be obtained by distilling off about 25 to 80% by weight, preferably about 30 to 60% by weight of 2,4'-diisocyanatodiphenylmethane and optionally 4,4'- and 2,2'-diisocyanatodiphenylmethane from a crude phosgenation product containing about 60 to 90% by weight, preferably about 65 to 75% by weight of diisocyanatodiphenylmethane isomers including about 20 to 60% by weight, preferably about 30 to 40% by weight of the 2,4'-isomer. Whichever method is employed, distillation may always be carried out in such a manner that the residue has the desired composition.

It is of course, also possible (and in many cases simpler in practice) to obtain the desired composition of isomers and oligomers of polyphenylpolymethylene polyisocyanate by blending various bottoms fractions.

The amount of polyisocyanates to be used for the production of the plasterboard according to the invention is about from 1 to 10% by weight, preferably about 2 to 8% by weight and most preferably about 3 to 7% by weight, based on the total weight of dry starting materials (reinforcing materials and gypsum binders; preferably dried cellulose particles and gypsum hemihydrate).

The cellulose particles which are the preferred reinforcing materials for the plasterboard according to the invention may be used in the form of cellulose fibers obtained, for example, from cardboard or refuse paper or the commonly used wood chips in lengths of about 1 to 20 mm, preferably about 3 to 10 mm, which may be obtained from spruce, fir, oak or pine. Wood fiber granulates, bark and other materials containing cellulose fibers may also be used, e.g. size-reduced kernels or shells.

Reinforcing materials having a mainly fibrous structure may also be used in addition to or instead of the preferred cellulose particles. These include inorganic materials with a fibrous structure, in particular glass fibers, and organic materials with a basically fibrous structure, such as natural, semi-synthetic or synthetic fibers such as cotton fibers or cotton dust, regenerated cellulose fibers, polyolefin fibers, polyacetal fibers, polyester fibers, polyamide fibers, polyimide fibers, polyamidoimide fibers, polyhydantoins and other high temperature resistant fibers such as Nomex fibers or Kevlar fibers.

The gypsum used for the manufacture of the plasterboards according to the invention may be any commercial or pure type of gypsum capable of rehydration. The gypsum used is preferably a commercial gypsum obtained mainly in the form of a hemihydrate by a process of calcining naturally occurring gypsum such as dolomite, keuper gypsum or shell lime gypsum or industrial waste gypsum or it may be gypsum in an anhydrous form.

According to the invention, additives such as gypsum accelerators, retarders, hardeners, liquefiers or fluidizing agents and dyes may be used in the manufacture of the plasterboard.

The plasterboard claimed according to the invention may be produced by various processes, either continuously or batchwise. If the plasterboard is required to be water-resistant over its whole cross-section, this may be achieved, for example, by wetting water-moistened wood chips with the required quantity of polyisocyanate and then adding gypsum in powder form. The resulting mixture is then scattered over a flat surface and compressed by means of a press to form a plasterboard which in the dry state has a density of about 0.4 to 1.8 g/cm$^3$, e.g. about 1.1 g/cm$^3$.

If for reasons of economy the plasterboard is to be made water-resistant only at the outer surfaces such a board may be produced by one of the two methods. In the first method, a mixture, e.g. of moist wood chips and gypsum containing polyisocyanate is spread out in a thin layer and covered with a thick layer of moist wood chips and gypsum free from polyisocyanate which in turn is covered by a polyisocyanate-containing thin layer. This arrangement of layers is then pressed to form a plate and dried. In the other method, the marginal zones of a plasterboard free from polyisocyanates but reinforced with cellulose particles is rendered water-resistant by applying preferably an aqueous dispersion of polyisocyanates to the surfaces of the board, e.g. by brush coating, roller coating, spraying or immersion, and then drying the plasterboard.

In both these processes, transport, dosing and mixing of the individual components may be carried out with apparatus known in the art. The usual equipment employed in polyurethane technology may be used for conveying and dosing the polyisocyanates or their aqueous dispersions. Spreading of the mixture, e.g. of moist wood chips, gypsum and polyisocyanates may be carried out continuously on conveyor belt systems conventionally used industrially for the manufacture of boards and panels. Stacking presses or platen presses may be used for batchwise pressing of the plaster mixtures to form the board according to the invention and continuous flow presses may be used for continuous production.

The plasterboard produced by the process according to the invention, strengthened with reinforcing materials, preferably cellulose particles, and with polyureas (from the polyisocyanates) have a high and much improved water resistance combined with increased flexural strength. The new plasterboards are therefore suitable not only for so-called "dry" internal rendering but also for installation in so-called "moist spaces".

The following examples serve to illustrate the invention. The parts given in the examples are parts by weight unless otherwise indicated.

Polyisocyanates used in the Examples:
Polyisocyanate A=polymethylene polyphenyl polyisocyanate prepared by removing diisocyanatodiphenylmethane from the crude phosgenation product of an aniline/formaldehyde condensate by distillation until the distillation residue has a viscosity of 100 mPas/25° C. (dinuclear content: 59/7%, trinuclear content: 21.3%, higher nuclear polyisocyanate content: 19.0%).
Polyisocyanate B=polymethylene polyphenyl polyisocyanate prepared by the same method as polyisocyanate A and having a viscosity of 400 mPas/25° C. (dinuclear content: 45.1%, trinuclear content: 22.3%, higher nuclear polyisocyanate content: 32.6%).
Polyisocyanate C =polyisocyanate B rendered emulsifiable in water by the addition of 5% by weight of an emulsifier according to U.S. Pat. No. 4,413,112.

The invention is further illustrated but is not intended to be limited by the following examples in which all parts and percentages are by weight unless otherwise specified.

EXAMPLES

Example 1

17.6 parts of spruce wood chips having a length of 3 to 7 mm and a moisture content of 10% by weight were moistened with 23.6 parts of water by stirring with an egg whisk. 5 parts of polyisocyanate A were added dropwise with continued stirring and mixed with the moist wood chips for one minute. 58.8 parts of gypsum hemihydrate were then added in powder form and the mixture was stirred for 30 seconds until homogeneous.

78.8 parts of the resulting mixture were scattered within 30 seconds into a wooden mold having a base measuring 4 cm×13 cm and the mixture was compressed to a height of 5 mm by means of a ram. After 20 minutes pressing, the sample was removed from the mold and stored at room temperature for 5 days.

The sample had a density of 1.14 g/cm$^3$ and a flexural strength measured according to DIN 53 452 of 11.2 N/mm$^2$. The water absorption of the material was determined by cutting up the sample into two boards each measuring 130×5.2 mm and storing the boards under water. The increase in weight of the boards was 4.2% after 2 hours storage in water and 11.2% after 24 hours storage in water.

Example 2

17.6 parts of spruce wood chips having a length of 3 to 7 mm and having a moisture content of 10% by weight were moistened with 29.5 parts of water by stirring the mixture with an egg whisk. 2 parts of polyisocyanate B were added dropwise with continued stirring in the course of 15 seconds and mixed with the moist wood chips within one minute. 58.8 parts of calcined gypsum (CaSO$_4$.½ H$_2$O) were then added in powder form with continued stirring and uniformly mixed with the isocyanate-wetted, moist wood chips within 30 seconds.

77.9 parts of the resulting mixture were introduced within 40 seconds into a wooden mold having a base measuring 13 cm×4 cm and the mixture was compressed to a height of 11 mm by means of a ram.

After 20 minutes pressing, the sample measuring 13 cm×4 cm×1.1 cm was removed from the mold and dried at room temperature for 5 days.

The resulting sample had a gross density of 1.1 g/cm$^3$ and a flexural strength according DIN 53 452 of 9.5 N/mm$^2$. The water absorption of the material after complete immersion in water as described in Example 1 was as follows: after 2 hours, 8 percent by weight, after 24 hours, 11 percent by weight.

Example 3

The procedure was the same as described in Example 2 with the exception that polyisocyanate A was replaced by an equal quantity of polyisocyanate C.

The sample obtained had a density of 1.1 g/cm$^3$ and a flexural strength according to DIN 53 452 of 9.2 N/mm$^2$. The water absorption determined as described in Example 1 was 11% by weight after 2 hours and 17% by weight after 24 hours.

Example 4

264 parts of spruce wood chips having an average thickness of 0.15 mm, a length of 3 to 7 mm and a moisture content of 10% by weight and 442 parts of water were mixed in a 20 liter stirrer tank within 2 minutes using an egg whisk. 30 parts of polyisocyanate A were added to the moistened chips within 30 seconds with stirring. 882 parts of pulverulent gypsum hemihydrate were then added within a further 40 seconds.

1323 parts of the resulting mixture was scattered by hand over a 30 cm×30 cm surface within 60 seconds and compressed to a height of 10 mm in a press. After 20 minutes pressing in the mold, the sample board was removed and the following properties were determined on the dried plasterboard after 5 days storage at room temperature:
Thickness of board: 11 mm,
Gross density: 1.18 g/cm$^3$,
Flexural strength determined according to DIN 53 452: 11.3 N/mm$^2$,
Water absorption of the board determined as described in Example 1:
after 2 hours, 10% by weight,
after 24 hours, 14% by weight.

Example 5 (Comparison)

The components consisting of wood chip, water and gypsum hemihydrate were mixed as described in Example 4 but without the addition of a polyisocyanate. A plasterboard was produced from 1348 parts of the resulting mixture by the method described in Example 4. This board had the following properties:
Thickness of board: 11 mm,
Gross density: 1.1 g/cm$^3$,
Flexural strength determined according to DIN 53 452: 5.8 N/mm$^2$,
Water absorption determined as described in Example 1:
after 2 hours, 30% by weight,
after 24 hours, 37% by weight.

Example 6

A dispersion of 40 parts of polyisocyanate C and 60 parts of water was uniformly applied by brush coating to a plasterboard produced from a mixture according to Example 5 (thickness of board 11 mm, gross density 1.1 g/cm$^3$). The quantity of dispersion applied was 1354 g/m$^2$.

After the coated plasterboard had been stored open for 5 days at room temperature, a plastic ring 2 cm in height and 8.4 cm in internal diameter was placed on the treated surface and sealed off from the surface of the board by means of a duroplastic silicone mass. Water was introduced into the plastic ring to a height of 1 cm and the absorption of water by the treated surface was determined.

The water absorption per m$^2$ of treated surface of the board was 18 g/m$^2$ after one hour and 415 g/m$^2$ after 24 hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the manufacture of plasterboard comprising combining a mixture consisting essentially of a gypsum binder capable of rehydration, water and wood chips having a length of 1 to 10mm wherein the ratio by weight of said wood chips to said gypsum binder is about 0.25:1 to 0.35:1, and subsequently pressing the resulting mixture, said process additionally comprising of adding a polyisocyanate to the mixture before pressing and applying polyisocyanate to the surface of the plasterboard after pressing and wherein the ratio of wood chips and gypsum to water is in the range of 2.6:1 to 3.2:1.

2. The process of claim 1 wherein said gypsum binder is gypsum hemihydrate.

3. The process of claim 2 wherein said polyisocyanate is a polymethylene polyphenyl polyisocyanate.

4. The process of claim 3 wherein said polyisocyanate is modified to render it emulsifiable in water.

5. The process of claim 2 wherein said polyisocyanate is present in an amount of about 1 to 10% by weight based on the total weight of gypsum hemihydrate and wood chips.

6. The process of claim 2 wherein said polyisocyanate is applied to the surface of the plasterboard after pressing.

7. A process for the manufacture of reinforced plasterboard comprising combining a mixture consisting essentially of gypsum hemihydrate, water, wood chips having a length of 1 to 10mm in an amount to provide a ratio of wood chips to gypsum-hemihydrate of about 0.25:1 to 0.35:1 and a polyisocyanate in an amount of about 1 to 10% by weight based on the total weight of said gypsum hemihydrate and said wood chips and pressing the resulting mixture into plasterboard wherein the ratio of wood chips and gypsum to water is in the range of 2.6:1 to 3.2:1.

8. The process of claim 7 wherein said polyisocyanate is a polymethylene polyphenyl polyisocyanate which is modified to render it emulsifiable in water.

9. The plasterboard produced in accordance with claim 1.

10. The plasterboard produced in accordance with claim 7.

11. A process for the manufacture of plasterboard comprising combining a mixture consisting essentially of a gypsum binder capable of rehydration, water and wood chips having a length of 1 to 10mm wherein the ratio by weight of said wood chips to said gypsum binder is about 0.25:1 to 0.35:1 and subsequently pressing the resulting mixture, said process additionally comprising applying polyisocyanate to the surface of the plasterboard after pressing and wherein the ratio of wood chips and gypsum to water is in the range of 2.6:1 to 3.2:1.

12. The process of claim 11 wherein said gypsum binder is gypsum hemihydrate.

13. The plasterboard produced in accordance with claim 11.

* * * * *